United States Patent [19]

Bobba

[11] Patent Number: 4,955,693
[45] Date of Patent: Sep. 11, 1990

[54] LASER SCANNER HAVING IMPROVED OPTICAL SCANNING WINDOW

[75] Inventor: Mohan L. Bobba, Eugene, Oreg.

[73] Assignee: Spectra-Physics, Inc., San Jose, Calif.

[21] Appl. No.: 364,083

[22] Filed: Jun. 9, 1989

[51] Int. Cl.$^5$ .......................... G02B 27/02; G06K 7/10
[52] U.S. Cl. .................................... 350/319; 350/3.71; 350/6.7; 235/467; 235/470
[58] Field of Search ................ 350/319, 3.71, 6.1–6.9, 350/6.91, 420, 421, 252, 276 R; 235/467, 470

[56] References Cited

U.S. PATENT DOCUMENTS 4,591,236  5/1986  Broockman et al. ............. 350/3.71
4,713,532  12/1987  Knowles ............................ 235/470

Primary Examiner—Bruce Y. Arnold
Assistant Examiner—James Phan
Attorney, Agent, or Firm—Killworth, Gottman, Hagan & Schaeff

[57] ABSTRACT

An optical window is disclosed for association with a scanning face of a laser scanner wherein a laser beam is projected through the window to define a scanning pattern and the optical window is supported such that at least one surface of the window is angularly oriented relative to the scanning face to improve the incidence angles of the laser beam on the window and/or the refractive angles of the laser beam at the window. Preferably, the window comprises a composite block of optical material having sections corresponding to portions of the scanning pattern of the laser scanner and being formed and supported to define the angular orientations of upper and lower surfaces of the sections relative to the scanning face of the scanner in accordance with the corresponding portions of the scanning pattern. Portions of the window through which the laser beam is not transmitted may be used to support the window and preferably are matted to reduce ambient light sensitivity of the laser scanner. Depending upon the geometry of the laser path within the laser scanner and the application, the window may comprise: a wedged block of optical material having an upper surface parallel to the scanning face and a lower surface angularly oriented relative to the upper face; a generally rectangular block of optical material having parallel upper and lower faces which are angularly oriented relative to the scanning face; or, a wedged block of optical material having an upper surface angularly oriented relative to the scanning face at a first angle of orientation and a lower face angularly oriented relative to the scanning face at a second angle of orientation different from the first angle.

17 Claims, 3 Drawing Sheets

LASER SCANNER HAVING IMPROVED OPTICAL SCANNING WINDOW

BACKGROUND OF THE INVENTION

The present invention relates generally to laser scanners and, more particularly, to an optical window associated with a scanning face of a laser scanner and through which a laser beam is projected to define a scanning pattern for the laser scanner wherein at least one surface of the optical window is angularly supported relative to the scanning face to improve the incidence angles of the laser beam on the window and/or the refractive angles of the laser beam at the window.

Laser scanners for use at point-of-sale checkout counters in supermarkets and other retail stores are becoming more and more common as the reliability of scanners increases and their costs decrease. The scanners are commonly mounted within the checkout counters such that they have generally upwardly facing windows through which laser beams are projected in defined scanning patterns. A scanning pattern is created by a laser and associated optical components which produce a plurality of intersecting scan lines to define the pattern. A bar coded label including for example a UPC, EAN or JAN code on the packaging of a product presented at a counter is passed through the scan volume of a laser scanner, i.e. the volume extending beyond the face of the scanner within which bar coded labels can be successfully read. Light reflected from a bar coded label is received back through the scanning window and processed to identify the product and provide pricing information for the sale and other retailing applications such as inventory control.

The scanning volume of a laser scanner can be increased by increasing the size of scan mirrors which define the scan pattern for a given scanner, particularly the mirrors which define the vertical scan lines. Unfortunately, increasing the size of the scan mirrors tends to increase the scanner size and particularly the scanner depth which is undesirable. Even for scanner designs with large scan volumes, scuffs and scratches in the scanning window due to repeated dragging of packages, cans, bottles and the like thereover impede transmission through the window and thereby reduce the scan volume.

To overcome reduced scan volume due to scuffed and scratched scanning windows, existing bar code scanners may have two windows through which the scanning beam passes, an inner window which is fixed to seal and protect the scanner and an outer window which is easily replaceable. In this way, the original scan volume is periodically restored by replacing the outer window to eliminate the scuffs and scratches which interfere with scanner operation. Unfortunately, the outer windows need to be replaced frequently to maintain scanner operation within acceptable levels resulting in undesirable service expenses.

It is thus perceived that a need exists for a laser scanner having an enlarged scan volume for a defined size of scan mirrors such that the scanner size and particularly the scanner depth does not have to be increased to obtain the enlarged scan volume. Such an enlarged scan volume would also reduce the frequency of replacement of outer scanning windows. Preferably, such a laser scanner would facilitate use of a single scanning spaced inwardly from the face of the scanner such that the outer window can be eliminated which of course would also eliminate service expenses incurred for replacing the outer window.

SUMMARY OF THE INVENTION

The present invention provides an improved optical scanning window for association with an opening through a scanning face of a laser scanner to satisfy the aforementioned needs. The improved optical window includes at least one surface which is angularly oriented relative to the scanning face of the laser scanner. The angularly oriented surface compensates for laser beam incidence and/or refractive angles which may be less than ideal due to the geometry required to define a desired scanning pattern within a prescribed physical volume, for example, the limited height (13 cm) scanners which are required for the European market. In this instance, the scanner height is dictated by the requirement that salesclerks sit while working. Preferably, the optical scanning windows of the present invention have wedge-shaped cross sections to change the incidence and/or refractive angles with the windows being supported such that one or both surfaces are angularly oriented relative to the scanning face. The shapes of the wedge-shaped sections may he selected to correspond to individual portions of a scanning pattern such that the resulting window is a composite block of optical material having different wedge cross sections depending upon where within the window the cross section is taken.

In accordance with one aspect of the present invention, an optical window associated with a scanning face of a laser scanner and through which a laser beam is projected to define a scanning pattern for the laser scanner comprises light transmissive window means formed of optical material for passing the laser beam through the scanning face. Support means is provided for supporting the window means such that at least one surface of the window means is angularly oriented relative to the scanning face to improve the incidence angles of the laser beam on the light transmissive window means and/or the refractive angles of the laser beam at the light transmissive window means to increase an effective scan volume of the laser scanner. The light transmissive window means may be mounted within the scanning face. Alternately, the light transmissive window means may comprise a first window mounted within the scanning face and a second window mounted adjacent to the first window within the laser scanner, the second window being supported such that at least one of its surfaces is angularly oriented relative to the scanning face.

The light transmissive window means may comprise a composite block of optical material having sections corresponding to portions of the scanning pattern of the laser scanner and being formed and supported to define the angular orientation of upper and lower surfaces of the sections relative to the scanning face in accordance with the corresponding portions of the scanning pattern. The optical material used to form the light transmissive window may be plastic and, if desired, the sections may be formed to smoothly transition between adjacent sections. In one embodiment, the light transmissive window is defined by the sections which are formed into the composite block in conformance with the scanning pattern and the remainder of the block defines the support means. In this embodiment, the remainder of the composite block which defines the support means preferably is matted to reduce ambient light sensitivity of the laser scanner.

In accordance with another aspect of the present invention, a laser scanner comprises a scanning face including an opening therein through which a laser beam is scanned to define a scanning pattern extending from the face. Laser beam generating means are provided for producing a laser beam and laser beam sweeping means receive the laser beam and sweep it through the opening. Window means formed of optical material and associated with the opening is provided for protecting the laser scanner and passing the laser beam through the opening. Support means is provided for supporting the window means such that at least one surface thereof is angularly oriented relative to the scanning face to improve the incidence angles of the laser beam on the window means and/or the refractive angles of the laser beam at the window means to increase an effective scan volume of the laser scanner. The window means may comprise a first window fitted within the light transmissive opening and a second window mounted adjacent to the first window within the laser scanner, the second window being supported such that at least one of its surfaces is angularly oriented relative to the scanning face. The window means also may comprise a single window.

Depending upon the geometry of the laser path within the laser scanner and the application, the window means may comprise: a wedged block of optical material having an upper surface parallel to the scanning face and a lower surface angularly oriented relative to the upper surface; a generally rectangular block of optical material having parallel upper and lower faces which are angularly oriented relative to the scanning face: or, a wedged block of optical material having an upper surface angularly oriented relative to the scanning face at a first angle of orientation and a lower face angularly oriented relative to the scanning face at a second angle of orientation different from the first angle. Preferably, the window means comprises a composite block of optical material having sections corresponding to portions of the scanning pattern of the laser scanner and being formed and supported to define the angular orientations of upper and lower surfaces of the sections in accordance with the corresponding portions of the scanning pattern. The optical material may be plastic and the section edges may be formed to smoothly transition between sections. In the embodiment where the sections are formed into a composite block to conform to the scanning pattern, the remainder of the block may define the support means and preferably is matted to reduce ambient light sensitivity of the laser scanner.

It is an object of the present invention to provide a laser scanner having an enlarged scan volume for a defined size of scan mirrors by means of an improved optical scanning window which improves the incidence angles of a laser beam on the window and/or the refractive angles at the window; to provide a laser scanner having an enlarged scan volume for a defined size of scan mirrors by means of an optical scanning window which has a wedge shaped cross section to change the incidence and/or refractive angles of a laser beam passing through the window: and, to provide a laser scanner having an enlarged scan volume for a defined size of scan mirrors by means of a sectioned optical window having sections corresponding to portions of the scanning pattern of the laser scanner and being formed and supported to define the angular orientations of upper and lower surfaces of the sections in accordance with the corresponding portions of the scanning pattern.

Other objects and advantages of the invention will be apparent from the following description, the accompanying drawings and the appended claims.

DETAILED DESCRIPTION OF THE INVENTION

Figure 1:
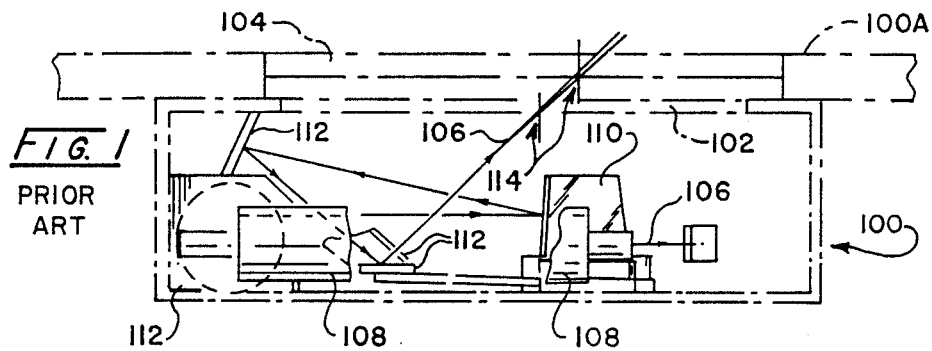
FIG. 1 is a schematic side elevational view of a laser scanner showing a two window structure of the prior art.

A prior art laser scanner 100 having two scanning windows, an inner window 102 and an outer window 104, which define a scanning face 100A of the laser scanner 100 is shown in FIG. 1. A laser beam 106 generated by laser beam generating means, such as a helium-neon laser 108, is directed upon laser beam sweeping means comprising a multi-faceted mirror head 110 which is rotated to sweep the beam 106 onto pattern mirrors 112 to in turn project the beam 106 through the windows 102, 104 in a defined scanning pattern. By making the inner window 102 fixed and the outer window 104 replaceable, the scanner 100 can be sealed and protected by the inner window 102 yet the problem of reduced scan volume due to scuffs and scratches in the outer window 104 produced by dragging items to be scanned over the outer window 104 can be overcome by periodically replacing the outer window 104 to return the scan volume to substantially its original value.

In FIG. 1, the beam 106 is shown as passing directly through the windows 102 104 for ease of illustration; however, in actuality, the beam 106 is both reflected and refracted as will be more apparent in view of the remainder of the disclosure which is concerned with improving the angles of incidence and/or refraction by means of improved optical scanning windows in accordance with the present invention. Since the specific design of the laser scanner 100 is not important to the present invention, it will not be further described herein. For additional details of the operation of the laser scanner 100 the reader is referred to U.S. patent application Ser. No. 064,317 entitled Optical Scan Pattern Generating Arrangement for a Laser Scanner which was filed June 18, 1987, is assigned to the same assignee as the present application and is incorporated herein by reference.

There is a certain amount of reflection of the laser beam 106 from the bottoms of the windows 102, 104. Such reflection of the laser beam 106 will increase exponentially and transmission will decrease exponentiallY if the incidence angles 114 are greater than Brewster's angle which is 56° for P-polarized light and 35° for S-polarized light. Reflection of the laser beam 106 from the bottoms of the windows 102. 104 results in reduced light levels in the scan patterns generated beyond the outer window 104 such that very little light is collected and passed to a photodetector (not shown) of the laser scanner 100 resulting in low level analog signals and the generation of increased thresholds. The final results are signal glitches and many unsuccessful reads.

Another problem in existing laser scanners is the scuffing and scratching of the outer window 104 as products to be purchased are continually dragged across the window which marking of the outer window 104 also reduces transmission of the laser beam 106 through the windows 102, 104. While the outer window 104 can be periodically replaced to substantially restore the performance of the scanner 100, the timing of such replacements must be sufficiently frequent to ensure satisfactory performance of the scanner. Oftentimes, this means accelerated and increased maintenance which adds to the operating costs of the scanners.

These problems can be alleviated for example by increasing the power of the laser beam 106; however, this is undesirable due to cost and safety considerations. The beam geometry and hence scan volume can also be increased by changing the scan pattern mirrors; however, this is undesirable since it normally will increase the size of the laser scanner, for example the depth, which is unacceptable in many applications. The novel solution of these problems in accordance with the present invention is to redesign the scanning window(s) such that the incidence angles and/or refractive angles of the laser beam 106 relative to the window(s) are improved. The window of the present invention is supported such that at least one surface of the window is angularly oriented relative to the scanning face 100A of the scanner 100.

Preferably, the window has a "wedge-shaped" cross section to change the incident and/or refractive angles of the laser beam 106 relative to the window. In this way, the angle of refraction can be decreased to increase the scan volume of a laser scanner or kept the same as the incidence angle by means of selecting the geometry of the window. Since the incidence angles of the laser beam 106 on the bottoms of the windows 102, 104 may vary substantially from the beginning of a scan to the end of the scan for some scan patterns, the window of the present invention may comprise a composite block of optical material having sections corresponding to portions of the scanning pattern, see FIGS. 6. 7 and 8. The sections of the composite block window are formed and supported to define the angular orientation of upper and/or lower surfaces of the sections relative to the scanning face 100A in accordance with the corresponding portions of the scanning pattern. In this way, the composite window has different cross sections to improve each portion of the scan pattern in accordance with the incidence and/or refractive angles of the laser beam 106 within each portion.

The present invention has several advantages for either a two window system or a one window system. In a two window system, the reflections of the laser beam 106 off the inside of the inner window 102 and the outer window 104 are deduced due to the improved incidence angles. The direction of the outgoing laser beam from the outer window 104 can be changed to increase the scan volume of the laser scanner by proper selection of the geometry of the window. For certain applications, for example vertical or other angular mounting of a scanner relative to horizontal, the improved window can be used as the outer window 104 and the outer surface of the window can be indented or recessed relative to the scanning face 100A. Recessing the window would greatly reduce if not eliminate wear on the outer surface of the window such that replacement of the outer window 104 would no longer be required or the inner window 102 could be eliminated thus resulting in a one window system. In addition, ambient light sensitivity can be reduced by matting the portion of the window which does not correspond to the scan pattern. The matted portion of the window can also serve as support means in this case. Finally, since the improved windows of the present invention also have increased thickness areas, the impact strength of the windows tends to be greater than prior art flat windows.

Figure 2:
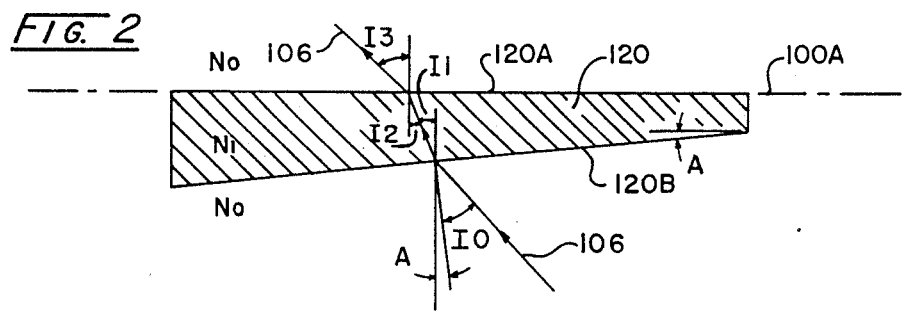
FIGS. 2 and 5 are cross sectional views of one form of window in accordance with the present invention wherein, as shown, the top surface is parallel to a scanning face of a laser scanner and the bottom surface is angularly oriented relative thereto.

The following description of preferred embodiments of the present invention, read with reference to the drawing figures, will further clarify the improved optical scanning windows of the present invention. It is noted that the embodiments age shown as single windows; however, each embodiment can be used in combination with a second window as either an inner window or an outer window. The first embodiment shown in FIG. 2 comprises a window 120 having a flat top surface 120A and a wedged bottom surface 120B which is angularly oriented at an angle A relative to the scanning face 100A of a laser scanner. Using Snell's law at the incidence boundary, i.e. the bottom surface 120B of the window 120.

$N_0 * \sin(I_0) = N_1 * \sin(I_1)$ $I_1 = \sin^{-1}((N_0/N_1 * \sin(I_0))$ $I_2 = I_1 + A$ $N_1 * \sin(I_2) = N_0 * \sin(I_3)$

EXAMPLE:

$I_0 = 55.0°$; $A = 5.0°$; $N_0 = 1.0$ (FOR AIR);

$N_1 = 1.48g$ (FOR FLEXIGLASS)

$I_1 = \sin^{-1}((1.0/1.48g) * \sin(55.0)) = 33.376°$ $I_2 = 33.376 + 5.0 = 38.376°$ $I_3 = \sin^{-1}((1.48g/1.0) * \sin(38.276)) = 67.578°$ With reference to this example and the remaining examples of the present application, "N" refers to the index of refraction for the corresponding medium and "I" identifies the corresponding angles as shown in the drawings.

The introduction of a 5 degree slope on the wedged bottom surface 120B and the flat top surface 120A of the window 120 does two things. One, the incidence angle is reduced to 55 degrees from 60 degrees such that the reflection of the laser beam 106 at the window 120 is reduced and the transmission through the window 120 is increased. Second, the laser beam 106 total refraction angle is increased such that the out going beam is bent downward by 7.578 degrees from the incidence beam. This is desirable only if the beam projecting out of the scanner has high incidence angles and needs to be bent downward to reduce the spot ellipticity on a vertical plane and reduce the reflection from the bottom surface(s) of the window(s). This may not be a desirable feature if the outgoing beam needs to have a steeper angle to increase the scan volume.

Figure 3:
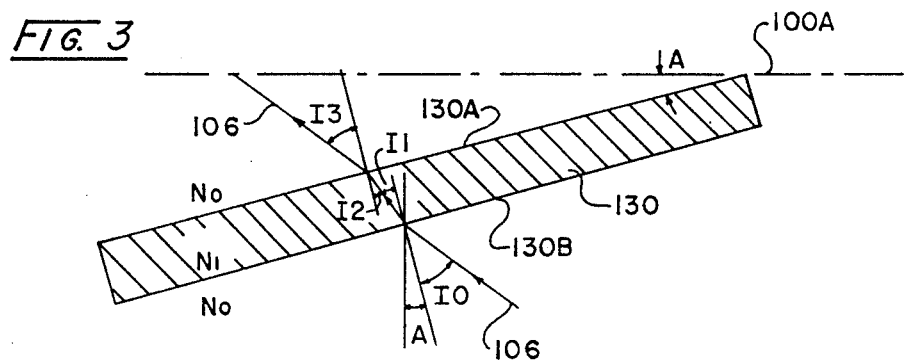
FIG. 3 is a cross sectional view of another form of window in accordance with the present invention wherein, as shown, the top surface and bottom surface are parallel relative to one another and both angularly oriented at the same angle relative to a scanning face of a laser scanner.

The second embodiment shown in FIG. 3 illustrates a window 130 which comprises a generally rectangular block of optical material having parallel upper and lower faces 130A and 130B which are angularly oriented relative to the scanning face 100A. The corresponding equations for the window 130 having upper and lower surfaces 130A and 130B inclined at the same angle A are:

$N_0 \sin(I_0) = N_1 \sin(I_1)$;
$I_1 = \sin^{-1}(N_0/N_1 * \sin(I_0))$
$I_2 = I_1$
$N_1 \sin(I_2) = N_0 \sin(I_3)$
$I_3 = \sin^{-1}(N_1/N_0 * \sin(I_2)) = \sin^{-1}(N_1/N_0 * \sin(I_1)) = I_0$ In this case the refraction angle is equal to the incidence angle irrespective of the angle A, since the upper and lower surfaces 130A and 130B are parallel to each other. The incidence angle can be changed by varying the angle A such that the incidence angle of the laser beam 106 can be decreased to a desirable angle by selecting the proper angle A. This is very desirable to reduce the reflections of the laser beam 106 off the bottom surface of a top window of a two window system due to high incidence angles. The selection of the angle A should also include the physical space available for the window 130. It is noted that even though the direction of the outgoing laser beam is not changed, the intensity of the outgoing beam is increased.

Figure 4:
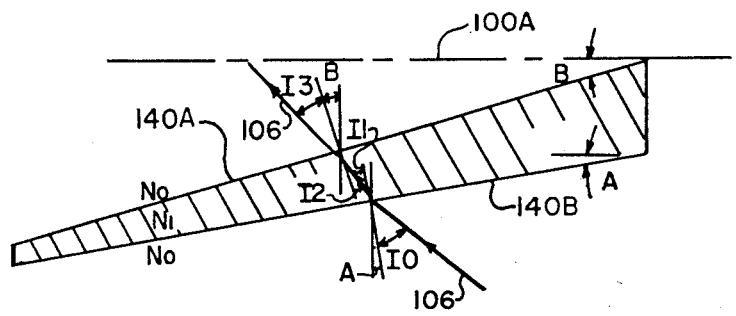
FIG. 4 is a cross sectional view of yet another form of window in accordance with the present invention wherein, as shown, the top surface is angularly oriented at a first angle relative to a scanning face of a laser scanner and the bottom surface is angularly oriented at a second angle relative to the scanning face with the second angle being different than the first angle.

In the third embodiment shown in FIG. 4, the upper and lower surfaces 140A and 140B of a window 140 are inclined at different angles B and A, respectively. The corresponding equations for the window 140 are:

$N_0 * \sin(I_0) = N_1 * \sin(I_1)$
$I_2 = I_1 + A - B$
$N_1 * \sin(I_2) = N_0 * \sin(I_3)$ When A=B, the refraction angle is equal to the incidence angle. i.e.. the same as the second embodiment of FIG. 3. When B=0.0 degrees, the refraction angle is greater than the incidence angle, i.e., the same as the first embodiment of FIG. 2. Here we consider the case where B is greater than A such that the refraction angle is smaller than the incidence angle. The incidence angle of the laser beam 106 on the lower surface 140B of the window 140 is decreased by A degrees and the refraction angle is decreased by approximately (B - A) degrees. The reflection of the laser beam 106 is decreased at the lower surface(s) of the window(s), and the scan volume can be increased in the vertical direction. The amount of the scan volume increase will depend on the angle (B - A), and the allowable ellipticity of the beam on a vertical plane.

For example:
$I_0 = 55.0°$; $A = 5.0°$; $B = 10.0°$; $N_0 = 1.0$; $N_1 = 1.489$:
$I_1 = \sin^{-1}((1.0/1.489) * \sin(55.0)) = 33.376°$
$I_2 = 33.376 + 5.0 - 10.0 = 28.376°$
$I_3 = \sin^{-1}((1.489/1.0) * \sin(28.376)) = 45.04°$ The angle between the refracted beam and the vertical plan is $I_3 + B = 45.0 + 10.0 = 55.0$ degrees. The incidence angle to a horizontal flat window for the same scan beam is $55 + A = 60$ degrees. The refraction angle is the same as the incidence angle for a horizontal flat window and is 60.0 degrees. The resultant change in the scan beam direction due to the window 140 as defined above is $60.0 - 55.0 = 5.0$ degrees. The scan volume in the outward direction is increased by an amount corresponding to this 5.0 degree decrease in the refraction angle.

Figure 5:
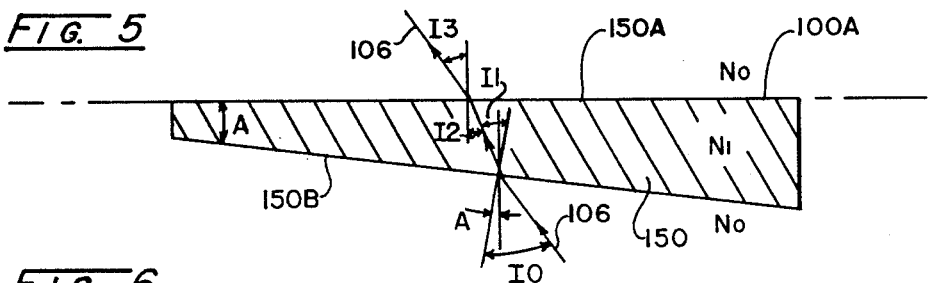

In the fourth embodiment shown in FIG. 5 the upper surface 150A of the window 150 is parallel to the scanning face 100A and the lower surface 150B is wedged such that the thick end of the window 150 extends towards the incident laser beam 106. The corresponding equations for the window 150 are:

$N_0 * \sin(I_0) = N_1 * \sin(I_1)$
$I_2 = I_1 - A$
$N_1 * \sin(I_2) = N_0 * \sin(I_3)$

| For example: | $I_o = 55.0°$ | $N_o = 1.0$ |
| --- | --- | --- |
| | $A = 5.0°$ | $N_1 = 1.489$ |
| | $B = 5.0°$ | |

$I_1 = \sin^{-1}((1.0/1.489) * \sin(55.0)) = 33.376°$
$I_2 = 33.376° - 5.0 = 28.376°$
$I_3 = \sin^{-1}((1.489/1.0) * \sin(28.376)) = 45.04°$ The window 150 of this embodiment can be used to increase the incidence angle(s) if the incidence angle(s) relative to the scanning face 100A are much less than Brewster's angle and to increase the scan volume in the vertical direction. The incidence angle(s) of the laser beam 106 is dependent on the wedge angle A. and a required incidence angle can be set by changing the wedge angle A. The refraction angle can be set to a required angle, for example to increase the scan volume, by changing the angle B, i.e. the angle of the upper surface 150A relative to the scanning face 100A. As shown in this embodiment, the change in the direction of the laser beam 106 is $50.0 - 45.0 = 5.0$ degrees. If the angle B is increased for the same wedge angle A, the refraction angle will be decreased. If the angle A is decreased to zero, then the refraction angle will be equal to the incidence angle as in the second embodiment of FIG. 3.

The incidence angles of the laser beam 106 on the lower surfaces of the windows will vary even within a given portion of a scan pattern. The incidence angles depend on the position of the corresponding one of the pattern mirrors 112 and the rotational angles of the facets of the mirror head 110, see FIG. 1. The incidence angles of a particular portion of a scan pattern, like the center horizontal and side horizontal portions, can be in a very narrow range for the laser beam 106, in which case the window geometry is relatively simple for that portion of the scan pattern. If the incidence angles are different and vary in a wide range of angles in a given portion of a scan pattern, for example the vertical portion of the scan pattern, the window geometry for that portion of the scan pattern is partitioned into different segments to optimize different ranges of the incidence angles.

The depth of the scanner is very critical for the European market and for vertically mounted scanners. The vertical space for a window in accordance with the present invention is thus limited on scanners for which the opto-mechanical design is fixed. Accordingly, it may not be possible to provide optimum incidence angles for existing scanners. However, the incidence angles can be improved as close as possible to optimum by selecting the window geometry. For new opto-mechanical designs, the incidence angles can be optimized with the windows of the present invention.

Most existing scanners have an X-bar scan pattern. The X-bar scan pattern consists of a horizontal scan portion side horizontal scan portions and two vertical scan portions. The variation in the incidence angles of the vertical scan beam on the lower surface of the upper windows are from 55.0 to 75.0 degrees. The reflection of the laser beam 106 from the upper windows during the vertical scan portion of a scan pattern varies from the starting of the scan line to end of the scan line. To substantially eliminate the reflections from the top windows, one or more of the examples explained above can be used.

A laser scanner commercially marketed as "The Freedom Scanner" by the assignee of the present application has an X-bar scan pattern in which the incidence angles of the center horizontal portion of the scan pattern varies from 48.5 to 49.75 degrees, the vertical scan portion varies from 56.0−75.7 degrees, and the side horizontal scan portion varies from 42.5−46.2 degrees. The reflection of the laser beam for the center horizontal and the side horizontal scan portions from the lower surface of each flat horizontal top window is around 12.0% for S-polarized, 2.0% for P-polarized and 5.0% for unpolarized laser light. The total transmission of the out going laser beam through two top windows for these scan beams is around 0.88×0.88 (worst case)=77%. The reflection of the vertical scan beam from the lower surface of the top window varies from 15.0% to 30.0% for unpolarized laser light. The transmission of the outgoing laser beam for the starting of the vertical scan line through two windows is 0.85×0.85 (worst case)=72%, and for the end of the vertical scan line is 0.57×0.57 (worst case)=32%. At the same time, the collection light (the laser beam light reflected from the bar code) transmission will also be reduced about the same. The total light collected at the photo detector is thus doubly reduced as a result of the high incidence angles such that the analog signal may be very weak, and the light reflected from the lower surfaces of top windows creates glitches which increase the signal threshold and result in unsuccessful reads of a bar code label. The internal reflection can be reduced and the transmission of laser light can be increased by applying one or more of the cases described in the previous pages.

There are two ways of implementing windows in accordance with the present invention for the Freedom scanner. First, a single window can be provided and the inner window eliminated to achieve the best results wherever the outer window can be recessed into the scanning face of the scanner. Second is the combination of the window of the present invention as the inner window and the flat glass window as the outer window which should be used where the scanning face of the scanner needs to be flat without any recess.

The cross section of each section of the window can be selected dependent upon the optimum conditions for the scanner. For the Freedom scanner, the selection criteria are: reduce the reflections from the windows; increase transmission of the outgoing laser beam and collection light; no changes to the existing optics, and no change in the scanner depth; and, increase the scan volume in the vertical direction. Such a scan window 160 is shown in perspective view in FIG. 6. The portion 160A of the window outside the X-bar scan pattern transmission portion 160B is preferably matted to reduce ambient light sensitivity and also serves as the support means for the window 160. Of course, other support means such as adjustable frames can be utilized in the invention of the present application.

Figure 6:
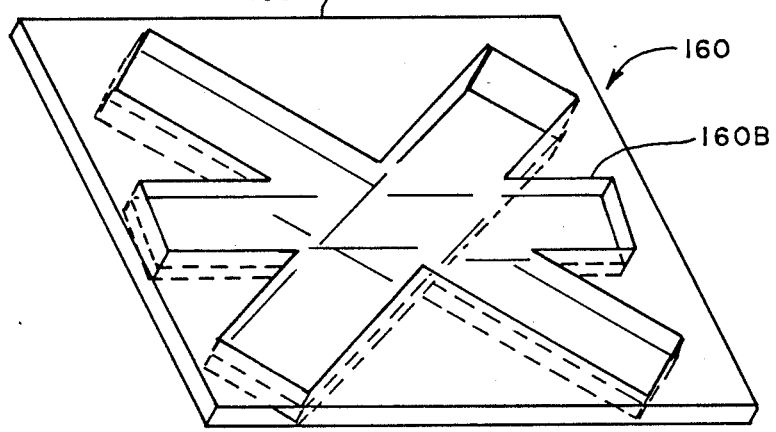
FIG. 6 is a perspective view of still another form of window in accordance with the present invention wherein the window is formed as a composite block of optical material having sections corresponding to portions of a scanning pattern with the sections being formed and supported to define the angular orientations of upper and lower surfaces of the sections relative to the scanning face in accordance with corresponding portions of the scanning pattern.
Figure 7:
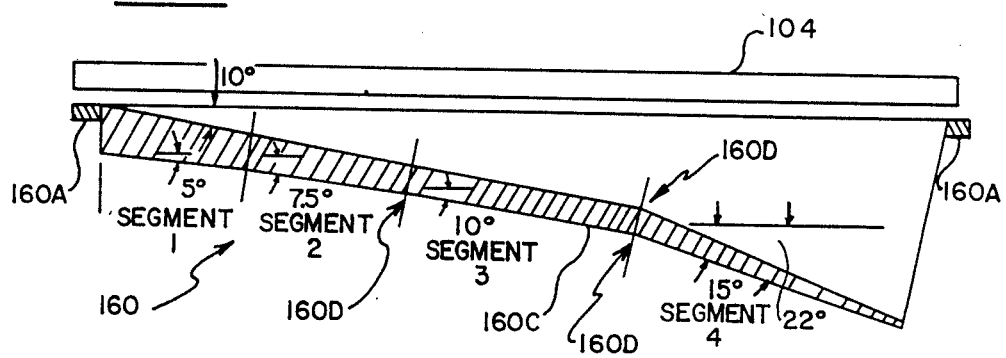
FIG. 7 is a cross sectional view of a number of segments of the window of FIG. 6 formed as a composite block of optical sections corresponding to portions of a scanning pattern of a commercially available laser scanner to illustrate one application of the preferred form of the present invention.
Figure 8:
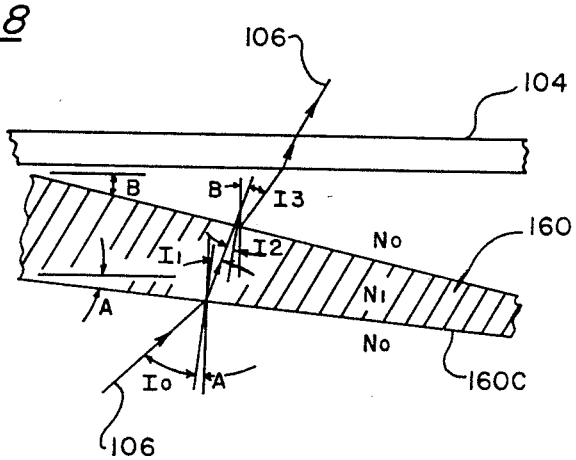
FIG. 8 illustrates the operation of any one of the optical sections of the window of FIG. 7.

The cross section of the window for the center horizontal scan portion can be selected without much difficulty, since the incidence angles for the laser beam are in a narrow range and less than Brewster's angle. The cross section of a vertical scan line section of the window 160 of FIG. 6 is shown in FIG. 7 and has four different segments, Segment 1–Segment 4, each with different cross sections. The selection of segments and their wedge angles was done by considering the freedom optic geometry and the incidence angles on the windows. The bottom surface 160C of the cross section of the window 160 has different wedge angles which are 5.0 degrees for segment 1, 7.5 degrees for segment 2, 10.0 degrees for segment 3 and 15.0 degrees for segment 4 as shown in FIG. 7. The top surface of the cross section of the window 160 has two different wedge angles which are 10.0 degrees for segments 1, 2 and 3 and 22.0 degrees for segment 4. The reflection of the laser beam from the lower surface 160C will be reduced at all the segments. The refraction angle is also less i.e., the scan volume is increased in the vertical direction, at segment 1, 2, & 4, and there is no change at segment 3. The corresponding equations for segment 1 are:

$I_0 = 55.0°$; $A = 5.0°$; $B = 10.0°$
$I_1 = \sin^{-1}(\sin(55)/1.489) = 33.376°$
$I_2 = I_1 + 5 - 10 = 28.376°$
$I_3 = \sin^{-1}(1.489 * \sin(28.376)) = 45.04°$
$IN_0 = I_3 + B = 55.04°$
$IN_1 = I_0 + A = 60.0°$ The change in the direction of the scan beam at Segment 1 equals $IN_1 - IN_0 = 60.0 - 55.0 = 5.0°$. The incidence angles are reduced by 5.0 degrees at the inner window 160. The incidence angles on the outer flat window has been reduced by 5.0 degrees by providing the top wedge angle of 10.0 degrees on the inner window and the scan volume has increased. The length of the vertical scan line has increased greater than 0.75" at the edge of the scanner and 0.40" at the center of the scanner. The transmission of the laser beam has increased by 7.0% for S-polarized light, 1.0% for P-polarized light and 3.0% for unpolarized light.

For segment 2.
$I_0 = 58.5°$; $A = 7.5°$; $B = 10.0°$; $N_0 = 1.0$;
$N_1 = 1.489$;
$I_1 = \sin^{-1}((1.0/1.489) * \sin(58.5)) = 34.93°$
$I_2 = I_1 + A - B = 32.43°$
$I_3 = \sin^{-1}(1.489 * \sin(32.43)) = 52.98°$
$IN_0 = I_3 + B = 52.98 + 10.0 = 62.98°$
$IN_1 = I_0 + A = 58.5 + 7.5 = 66.0°$ The change in the direction of the laser beam at segment 2 is thus 66.0−62.9832 3.02 degrees. The incidence angles are reduced at the inner window by 7.5 degrees and at the outer window by 3.0 degrees. The reflection of the laser beam from the inner window will be reduced more than that of the outer window. The transmission of the laser beam has increased at the inner window by 8.0% for S-polarized light. 3.0% for P-polarized light ad 4.0% for unpolarized light.

For segment 3.

$I_0 = 60.0°$; $A = 10.0°$; $B = 10.0°$;
$I_1 = \text{Sin}^{-1}(1.0/1.489) * \text{Sin}(60.0)) = \mathbf{35.56°}$
$I_2 = I_1 = 35.56°$
$I_3 = I_0 = 60.0°$ The incidence angles at the inner window are reduced by 10.0 degrees, and have not been modified at the outer window since segment 3 does not have a wedge shaped cross section such that the reflection of the laser beam from the inner window has been reduced but has not been changed at the outer window. The transmission of the laser beam has increased at the inner window by 12.0% for S-polarized light. 7.0% for P-polarized light and 10.0% for unpolarized light.

For segment 4.

$I_0 = 60.0°$; $A = 15.0°$; $B = 22.0°$;
$I_1 = \text{Sin}^{-1}((1.0/1.489) * \text{Sin}(60.0)) = 35.56°$
$I_232 I_1 + A - B = 28.56°$
$I_3 = \text{Sin}^{-1}((1.489 * \text{Sin}(28.56)) = 45.38°$
$IN_0 = I_3 + B = 67.38°$
$IN_1 = I_0 + A = 75.0°$ The incidence angles have been reduced by 15.0 degrees at the inner window, and 7.62 degrees at the outer window due to the reduced refraction angle at the inner window. The transmission of the laser beam is increased at the outer an dinner windows, and is 24.0% for S-polarized light, 15.0% for P-polarized light and 20.0% for unpolarized light at the inner window. The reflection of the laser beam from the outer window is reflected more from the top surface of the inner window due to the wedge shape of the inner window such that a very small amount of reflected light from the upper window gets into the scanner and therefore the number of glitches or misreads is reduced.

The center horizontal portion of the scan pattern has incidence angles from 48.5 to 49.75 degrees on the lower surface of the outer window. The window geometry for the horizontal scan portion are inclined 10.0 degrees, such that the incidence angles are reduced. The 10.0 degree inclined plane of the center horizontal window segment will be matched with the 10.0 degree inclined planes of the right and left vertical segments (segment #3). By matching these window segments, the construction of the window becomes simpler. Segment 3 of the left and right vertical scan portions overlap each other, and match with the center horizontal scan portion. The side horizontal scan portions overlap with the vertical scan portions.

The incidence angles of the side horizontal scan portions are from 42.5 to 46.2 degrees. These incidence angles are reduced by 10.0 degrees since these scan lines overlap on the vertical scan segments. The reflection of the laser beam from the wedge segment will be less than 5.0%. This is acceptable without any additional modifications to the wedge segments. The segments will have the required widths to have maximum possible collection light. The complete window can be molded into one piece with an optical quality plastic material such as Flexiglass. A matted surface is preferably provided on the top surface of the non-wedged segment area or portion 160A of the window 160 to reduce ambient light transmission into the scanner. If the window is used as outer window, the matt surface can be provided on the bottom surface of the non-wedged area of the window.

The wedged segment area or portion 160B will have maximum possible transmission for the wedge shapes. The wedged segment area or portion 160B will be recessed on the top surface of the window. The segment transition areas preferably have a smooth radius such as at transition points 160D such that the scan line will be substantially continuous. A hard coating can be applied on the top surface of the wedged segments or portion 160B to reduce the wear and scratches due to occasional package touching and dragging from the wedged surface (since the wedged surface is recessed on the top surface of the window, packages very seldom by touch the wedged surface), when the window is used as an upper window. A number of ribs (not shown) can be provided on the bottom surface of the window 160 to increase the impact strength to withstand the impact of packages which are dropped on the outer window.

Having thus described the improved optical scanning window for a laser scanner of the present invention in detail and by reference to preferred embodiments thereof, it will be apparent that modifications and variations are possible without departing from the scope of the invention defined in the appended claims.

What is claimed is:

1. An optical window associated with a scanning face of a laser scanner and through which a laser beam is projected to define a scanning pattern for the laser scanner, said optical window comprising:
   light transmissive window means formed of optical material for passing said laser beam through said scanning face; and
   support means for supporting said window means such that at least one surface of said window means is angularly oriented relative to said scanning face to improve the incidence angles of said laser beam on said light transmissive window means and/or the refractive angles at said light transmissive window means to increase an effective scan volume of said laser scanner.

2. An optical window as claimed in claim 1 wherein said light transmissive window means is mounted within said scanning face.

3. An optical window as claimed in claim 1 wherein said light transmissive window means comprises a first window mounted within said scanning face and a second window mounted adjacent to said first window within the laser scanner, said second window being supported such that at least one of its surfaces is angularly oriented relative to said scanning face.

4. An optical window as claimed in claim 1 wherein said light transmissive window means comprises a composite block of optical material having sections corresponding to portions of said scanning pattern and being formed and supported to define the angular orientation of upper and lower surfaces of said sections relative to said scanning face in accordance with said corresponding portions of said scanning pattern.

5. An optical window as claimed in claim 4 wherein said optical material is plastic and said sections are formed to smoothly transition between sections.

6. An optical window as claimed in claim 5 wherein said sections are formed into said composite block to conform to said scanning pattern with the remainder of said block defining said support means.

7. An optical window as claimed in claim 6 wherein the remainder of said composite block which defines said support means is matted to reduce ambient light sensitivity of said laser scanner.

8. A laser scanner comprising:
- a scanning face including an opening therein through which a laser beam is scanned to define a scanning pattern extending from said face;
- laser beam generating means for producing a laser beam;
- laser beam sweeping means for receiving said laser beam and sweeping said laser beam through said opening;
- window means formed of optical material and associated with said opening for protecting said laser scanner and passing said laser beam through said opening; and
- support means for supporting said window means such that at least one surface thereof is angularly oriented relative to said scanning face to improve the incidence angles of said laser beam on said window means and/or the refractive angles at said window means to increase an effective scan volume of said laser scanner.

9. A laser scanner as claimed in claim 8 wherein said window means comprises a first window fitted within said light transmissive opening and a second window mounted adjacent to said first window within said laser scanner, said second window being supported such that at least one of its surfaces is angularly oriented relative to said scanning face.

10. A laser scanner as claimed in claim 8 wherein said window means comprises a single window.

11. A laser scanner as claimed in claim 8 wherein said window means comprises a wedged block of optical material having an upper surface parallel to said scanning face and a lower surface angularly oriented relative to said upper surface.

12. A laser scanner as claimed in claim 8 wherein said window means comprises a generally rectangular block of optical material having parallel upper and lower faces which are angularly oriented relative to said scanning face.

13. A laser scanner as claimed in claim 8 wherein said window means comprises a wedged block of optical material having an upper surface angularly oriented relative to said scanning face at a first angle of orientation and a lower face angularly oriented relative to said scanning face at a second angle of orientation different from said first angle.

14. A laser scanner as claimed in claim 8 wherein said window means comprises a composite block of optical material having sections corresponding to portions of said scanning patterns and being formed and supported to define the angular orientation of upper and lower surfaces of said sections in accordance with said corresponding portions of said scanning pattern.

15. A laser scanner as claimed in claim 14 wherein said optical material is plastic and said sections are formed to smoothly transition between sections.

16. A laser scanner as claimed in claim 15 wherein said sections are formed into said composite block to conform to said scanning pattern with the remainder of said block defining said support means.

17. A laser scanner as claimed in claim 16 wherein the remainder of said composite block which defines said support means is matted to reduce ambient light sensitivity of said laser scanner.

* * * * *